(12) United States Patent
Gawali et al.

(10) Patent No.: US 8,370,679 B1
(45) Date of Patent: Feb. 5, 2013

(54) METHOD, APPARATUS AND SYSTEM FOR IMPROVING FAILOVER WITHIN A HIGH AVAILABILITY DISASTER RECOVERY ENVIRONMENT

(75) Inventors: Ashish L. Gawali, Maharastra (IN); Subash Rajaa, Maharastra (IN)

(73) Assignee: Symantec Corporation, Mountain View, CA (US)

( * ) Notice: Subject to any disclaimer, the term of this patent is extended or adjusted under 35 U.S.C. 154(b) by 276 days.

(21) Appl. No.: 12/165,400

(22) Filed: Jun. 30, 2008

(51) Int. Cl.
*G06F 11/00* (2006.01)
(52) U.S. Cl. .................. 714/3; 714/25; 714/37
(58) Field of Classification Search ............... 714/3, 25, 714/37
See application file for complete search history.

(56) References Cited

U.S. PATENT DOCUMENTS

| | | | |
|---|---|---|---|
| 6,438,705 B1 * | 8/2002 | Chao et al. ................ 714/4.11 |
| 6,789,213 B2 * | 9/2004 | Kumar et al. ................ 714/13 |
| 6,895,534 B2 * | 5/2005 | Wong et al. ................ 714/55 |
| 6,928,580 B2 * | 8/2005 | Pedone et al. ................ 714/6.3 |
| 6,944,788 B2 * | 9/2005 | Dinker et al. ................ 714/4.11 |
| 6,957,251 B2 * | 10/2005 | Wisner et al. ................ 709/220 |
| 7,058,846 B1 * | 6/2006 | Kelkar et al. ................ 714/4.4 |
| 7,076,687 B2 * | 7/2006 | Fujibayashi et al. ........ 714/6.31 |
| 7,124,320 B1 * | 10/2006 | Wipfel ................ 714/13 |
| 7,171,452 B1 * | 1/2007 | Gole ................ 709/212 |
| 7,213,246 B1 * | 5/2007 | van Rietschote et al. ........ 718/1 |
| 7,360,123 B1 * | 4/2008 | Westenberg et al. ........ 714/47.2 |
| 7,370,099 B2 * | 5/2008 | Hara et al. ................ 709/223 |
| 7,389,300 B1 * | 6/2008 | Shah et al. ................ 1/1 |
| 7,392,421 B1 * | 6/2008 | Bloomstein et al. ........... 714/4.4 |
| 7,434,087 B1 * | 10/2008 | Singh ................ 714/4.11 |
| 7,464,378 B1 * | 12/2008 | Limaye et al. ................ 718/100 |
| 7,475,204 B2 * | 1/2009 | Buah et al. ................ 711/161 |
| 7,480,827 B2 * | 1/2009 | Callaway et al. ............. 714/6.3 |
| 7,529,814 B2 * | 5/2009 | Wadia et al. ................ 709/220 |
| 7,529,822 B2 * | 5/2009 | Joshi et al. ................ 709/223 |
| 7,574,620 B2 * | 8/2009 | Hartung ................ 714/4.21 |
| 7,580,994 B1 * | 8/2009 | Fiszman et al. .............. 709/223 |
| 7,702,667 B2 * | 4/2010 | Yahalom et al. ............. 707/611 |
| 7,730,153 B1 * | 6/2010 | Gole et al. ................ 709/215 |
| 7,779,295 B1 * | 8/2010 | Shah et al. ................ 714/6.32 |
| 7,900,002 B2 * | 3/2011 | Lyon ................ 711/161 |
| 7,917,469 B2 * | 3/2011 | Bernhard et al. ............. 707/610 |
| 2003/0005350 A1 * | 1/2003 | Koning et al. ................ 714/4 |
| 2004/0153708 A1 * | 8/2004 | Joshi et al. ................ 714/4 |

(Continued)

OTHER PUBLICATIONS

"Disaster Recovery With Solaris™ Cluster," White Paper, Apr. 2007, Sun Microsystems, Inc., pp. 1-18.

(Continued)

*Primary Examiner* — Loan L. T. Truong
(74) *Attorney, Agent, or Firm* — Campbell Stephenson LLP (57) ABSTRACT

A method, apparatus and system for improving failover within a high-availability computer system are provided. The method includes obtaining one or more parameters associated with a disaster recovery protocol of at least one resource of any of the first cluster, second cluster and high-availability computer system. The method also includes monitoring one or more states of the parameters. The method further includes detecting, as a function of the parameters and states, one or more anomalies of any of the first cluster, second cluster and high-availability computer system, wherein the anomalies are types that impact the failover. These anomalies may include anomalies associated with the disaster-recovery protocols within the first and/or second clusters ("intra-cluster anomalies") and/or anomalies among the first and second clusters ("inter-cluster anomalies"). The method further includes generating an alert in response to detecting one or more of the anomalies.

20 Claims, 5 Drawing Sheets

U.S. PATENT DOCUMENTS

| | | | |
|---|---|---|---|
| 2004/0243699 A1* | 12/2004 | Koclanes et al. | 709/224 |
| 2005/0144513 A1* | 6/2005 | Nakamura et al. | 714/6 |
| 2006/0085668 A1* | 4/2006 | Garrett | 714/4 |
| 2006/0117212 A1* | 6/2006 | Meyer et al. | 714/4 |
| 2006/0155912 A1* | 7/2006 | Singh et al. | 711/6 |
| 2006/0161808 A1* | 7/2006 | Burkey | 714/6 |
| 2007/0174660 A1* | 7/2007 | Peddada | 714/4 |
| 2007/0294493 A1* | 12/2007 | Buah et al. | 711/156 |
| 2008/0016386 A1* | 1/2008 | Dror et al. | 714/4 |
| 2008/0046483 A1* | 2/2008 | Lehr et al. | 707/204 |
| 2008/0162983 A1* | 7/2008 | Baba et al. | 714/3 |
| 2008/0250267 A1* | 10/2008 | Brown et al. | 714/4 |
| 2009/0055689 A1* | 2/2009 | Petersen | 714/47 |
| 2009/0125751 A1* | 5/2009 | Dawson et al. | 714/2 |
| 2009/0171732 A1* | 7/2009 | Bobak et al. | 705/8 |
| 2009/0172460 A1* | 7/2009 | Bobak et al. | 714/2 |
| 2009/0234484 A1* | 9/2009 | Vacar et al. | 700/110 |
| 2009/0307166 A1* | 12/2009 | Routray et al. | 706/46 |

OTHER PUBLICATIONS

Benjamin, Lee, "Communications: Data Protection and Disaster Recovery for Exchange Server 2007," TechNet Magazine, Jul. 2007.

Rampratap, Amarnath, "Microsoft® Exchange 2007 Disaster Recovery Model Using NetApp Solutions," Network Appliance, Inc., Jul. 2007, TR-3584.

Read, Tim, "Architecting Availability and Disaster Recovery Solutions," Sun BluePrints™ On-Line, Apr. 2007, Sun Microsystems, Inc.

\* cited by examiner

METHOD, APPARATUS AND SYSTEM FOR IMPROVING FAILOVER WITHIN A HIGH AVAILABILITY DISASTER RECOVERY ENVIRONMENT

BACKGROUND

1. Field of the Invention

The following generally relates to disaster recovery for computing systems, services, and/or data, and more particularly, to a method, apparatus and system for improving failover within a high availability disaster recovery environment.

2. Description of the Related Art

Uninterrupted continuity of business functions is vital to attain an edge in the competitive market of today's world. Various business groups, such as data centers, production factories, stock exchanges, financial or banking companies, and other entities, have a need for a certain absolute degree of operational continuity during their operations To meet such objective, which is commonly referred to as "business continuity," the business groups generally rely "high availability" ("HA") computing services to service needs of their employees, customers, general members of the public and/or others (collectively "clients"). These business groups typically employ, use, are provided with or otherwise take advantage of HA-computing systems to provide such HA-computing services, and in turn, provide seemingly uninterrupted availability of data ("data availability") to the clients.

To facilitate providing the HA-computing services (and the seemingly uninterrupted data availability), each of the HA-computing systems employ a number of computing resources (e.g., hardware resources and/or software resources). These computing resources typically include computing resources for operating the HA-computing services ("operating resources") and computing resources redundant to the operating-computing resources ("redundant resources") along with protocols ("disaster-recovery protocols") for recovering from a failure.

The failure may include and/or result from one or more man-made and/or natural disasters, including, for example, human errors; power failures; damaged, corrupt, unavailable and/or failed computing resources; earthquakes; floods, etc., effecting one or more of the HA-computing services operating on the operating resources. Generally, the HA-computing services failover to the redundant resources in accordance with the disaster-recovery ("DR") protocols in response to an occurrence of the failure.

The DR protocols generally include multiple factors, such as specific applications (e.g. critical applications), multiple standards defined by service-level agreements ("SLA"), compliances (e.g., data recovery compliance, business compliance) and the like. An administrator of the HA-computing system typically carries out the DR protocols during the normal computing operation. However, when the administrator neglects such DR protocols anomalies associated with the protection provided by the DR protocols may arise. These anomalies may affect the ability of the HA-computing systems to failover properly, or worse yet, failover at all (i.e., an abortive failover), and thereby fail to meet requirements of the business continuity.

SUMMARY

A method, apparatus and system for improving failover within a high-availability computer system are provided. The method includes obtaining one or more parameters associated with a disaster recovery protocol of at least one resource of any of the first cluster, second cluster and high-availability computer system; monitoring one or more states of the parameters; detecting, as a function of the parameter and states, one or more anomalies of any of the first cluster, second cluster and high-availability computer system, wherein anomalies are types that impact the failover; and generating an alert in response to detecting the anomalies.

BRIEF DESCRIPTION OF THE DRAWINGS

So the manner in which the above recited features are attained and can be understood in detail, a more detailed description is described below with reference to Figures illustrated in the appended drawings.

The Figures in the appended drawings, like the detailed description, are examples. As such, the Figures and the detailed description are not to be considered limiting, and other equally effective examples are possible and likely. Furthermore, like reference numerals in the Figures indicate like elements, and wherein.

DETAILED DESCRIPTION

Example High-Availability Computing System

Figure 1:
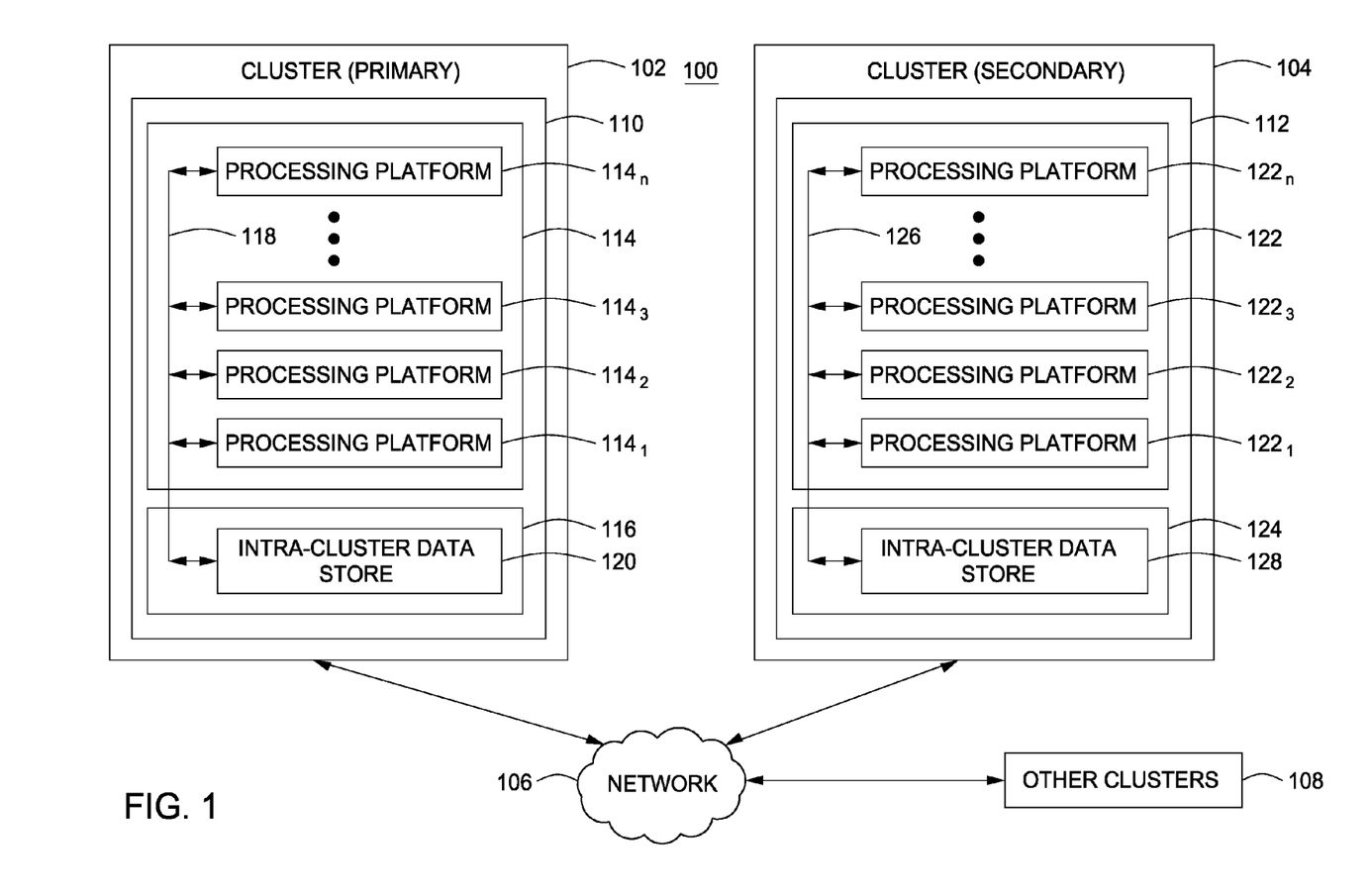
FIG. 1 is a block diagram illustrating an example architecture for a high-availability computing system.

FIG. 1 is a block diagram illustrating example architecture for a high-availability computing system 100. The high-availability ("HA") computing system 100 includes a primary cluster of computers ("primary cluster") 102 disposed at a first installation site and a secondary cluster of computers ("secondary cluster") 104 disposed at a second installation site; although the primary and second clusters 102,104 may be disposed at the same installation site. The primary and secondary clusters 102, 104 may communicatively couple via a network 106.

The HA computing system 100 may optionally include one or more additional primary and/or secondary clusters (shown collectively as "other clusters 108"). These other clusters 108 may include architecture the same as or analogous to the architecture of the primary and/or secondary clusters 102, 104, and/or operate in the same or in a manner analogous to the primary and/or secondary clusters 102, 104. For simplicity of exposition, the architecture and operation of the other clusters is assumed herein to be the same as the primary and/or second clusters 102, 104, unless otherwise stated.

The primary cluster 102 generally handles providing HA-computing services during normal operation, and the secondary cluster 104 generally handles providing one or more of the HA-computing services responsive to a failover from the primary cluster 102. To facilitate this, the primary and secondary clusters 102, 104 may include a number of primary and secondary-cluster resources ("primary-cluster resources and secondary-cluster resources") 110, 112, respectively.

Details of example architectures of primary-cluster and secondary cluster resources, which may be representative of respective architectures of the primary-cluster and secondary-cluster resources 110, 112, are described with reference to FIGS. 2A and 2B, respectively.

The primary-cluster resources 110 may include may include a large number of elements, most of which are not shown for simplicity of exposition. As shown, the primary-cluster resources 110 include primary-cluster processing resources 114 and primary-cluster storage resources 116 that are communicatively coupled via a communication link ("intra-cluster link") 118. The intra-cluster link 118 may be formed in accordance with one or more protocols of wired, wireless, satellite, and/or optical communications, including, for example, Ethernet and synchronous optical networking ("SONET") protocols.

The primary-cluster processing resources 114 may include a number of clustered and/or virtualized processing platforms $114_{1-n}$, which may each include attendant data storage (not shown), for carrying out the HA-computing services during normal operation. The primary-cluster storage resources 116 may include a ("primary intra-cluster") data store 120 that is accessible to and provisioned to storing information associated with the HA-computing services carried out by one or more the processing platforms $114_{1-n}$.

Analogous to the primary-cluster resources 110, the secondary-cluster resources 112 may include may include a large number of elements, most of which are not shown for simplicity of exposition. As shown, the second-cluster resources 112 include secondary-cluster processing resources 122 and secondary-cluster storage resources 124 that are communicatively coupled via another communication link ("intra-cluster link") 126. The intra-cluster link 126 may be formed in accordance with one or more protocols of wired, wireless, satellite, and/or optical communications, including, for example, Ethernet and SONET protocols.

The secondary-cluster processing resources 122 may include a number of clustered and/or virtualized processing platforms $122_{1-n}$, which may each include attendant data storage (not shown), for carrying out one or more of the HA-computing services after the failover. The secondary-cluster storage resources 124 may include a ("secondary intra-cluster") data store 128 that is accessible to and provisioned to storing information associated with the HA-computing services carried out by one or more the processing platforms $122_{1-n}$. The network 106 may provide one or more communication paths among any of, any combination of, any multiple of, any combination of multiples of, etc. (collectively "any") of the primary cluster 102, secondary cluster 104 and other clusters 108. The network 106 may be a partial or full deployment of most any communication or computer network, including any of a public or private, terrestrial wireless or satellite, or wireline network. As such, the network 106 may include network elements from a Public Switch Telephone Network ("PSTN"), the Internet, core and proprietary public networks, wireless voice and packet-data networks, such as 1G, 2G, 2.5G, 3G and/or 4G telecommunication networks, wireless office telephone systems ("WOTS") and/or wireless local area networks ("WLANs"), including, Bluetooth and/or IEEE 802.11 WLANs, wireless personal area networks ("WPANs"), wireless metropolitan area networks ("WMANs") and the like.

The network elements may include circuit-switched as well as packet-data elements to provide transport of information any of the primary cluster 102, secondary cluster 104 and other clusters 108. The network elements may be configured to communicate such information using any number of protocols and in any manner consistent with exchanging (e.g., sending and/or receiving) such information among any of the first cluster 102, second cluster 104 and other clusters 108. These protocols may include standardized, proprietary, open-source, and freely-available communication protocols for communicating content in circuit-switching and/or packet data networks, and the like.

During operation, the primary-cluster resources 110 may exchange with the secondary cluster 104 one or more states of the primary-cluster resources 110, including one or more states of any of the primary-cluster processing resources 114 and/or the primary-cluster storage resources 116. The secondary cluster may use these states ("inter-cluster states") to replicate the primary-cluster resources 110 at the secondary-cluster resources 112.

The primary-cluster processing resources 114 may exchange with the primary-cluster storage resources 116 one or more states of primary-cluster resources 110, including, for example, one or more states of the attendant data storage of each of the processing resources $114_{1-n}$. These states ("intra-cluster states") may be used to replicate such resources within the primary cluster 102. Analogously, the second-cluster processing resources 122 may exchange with the secondary-cluster storage resources 124 intra-cluster states of the secondary-cluster resources 112, including, for example, one or more states of the attendant data storage of each of the processing resources $122_{1-n}$.

To facilitate this, the primary cluster 102 may maintain one or more parameters associated with primary-cluster resources 110 ("cluster parameters"). The primary cluster 102 may also obtain and/or maintain one or more parameters associated with any of the second-cluster resources 112, resources associated with the other clusters 108 and/or the HA-computing system 100 ("system parameters").

Analogously, the secondary cluster 102 may maintain cluster parameters associated with the secondary-cluster resources 112. The secondary cluster 102 may also obtain and/or maintain system parameters associated with any of the first-cluster resources 112, resources associated with the other clusters 108 and/or the HA-computing system 100.

As described in more detail below, the primary cluster 102 (or secondary cluster 104) may function to obtain one or more parameters associated with one or more disaster recovery protocols ("DR-protection parameters") of at least one resource of any of the first, second and/or other clusters 102, 104 and/or 108 and high-availability computer system 100. monitor one or more states of the DR-protection parameters ("monitored DR-protection states"), detect, as a function of the DR-protection parameters and states, one or more anomalies of any of the first, second and/or other clusters 102, 108 and 108 and high-availability computer system 100, wherein the anomalies are types that impact the failover; and generate an alert in response to detecting the anomalies. The types of anomalies that affect the failover may include those (i) within the primary cluster 102 ("intra-cluster anomalies") and/or (ii) among the primary and secondary (or other) clusters 102, 104, respectively ("inter-cluster anomalies").

By performing the foregoing functions, corrective action may be taken to resolve the anomalies to improve failover upon an occurrence of a failure. Beneficially, the foregoing functions may allow the HA-computing system 100 to satisfy fairly stringent requirements for business continuity.

Example Cluster Resources

Figure 2A:
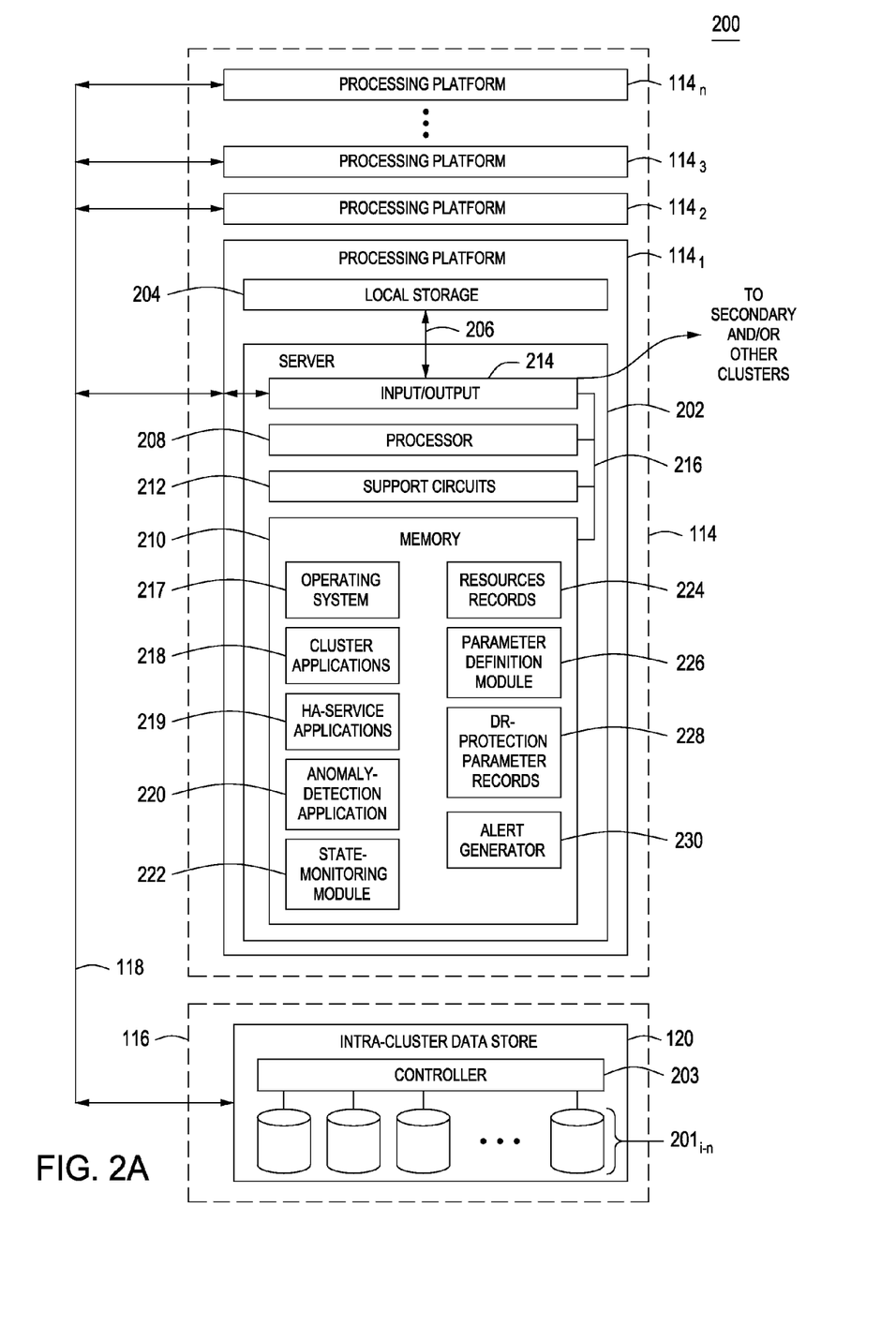
FIGS. 2A and 2B are block diagram illustrating example primary and secondary cluster resources of respective clusters of a high-availability computing system.
Figure 2B:
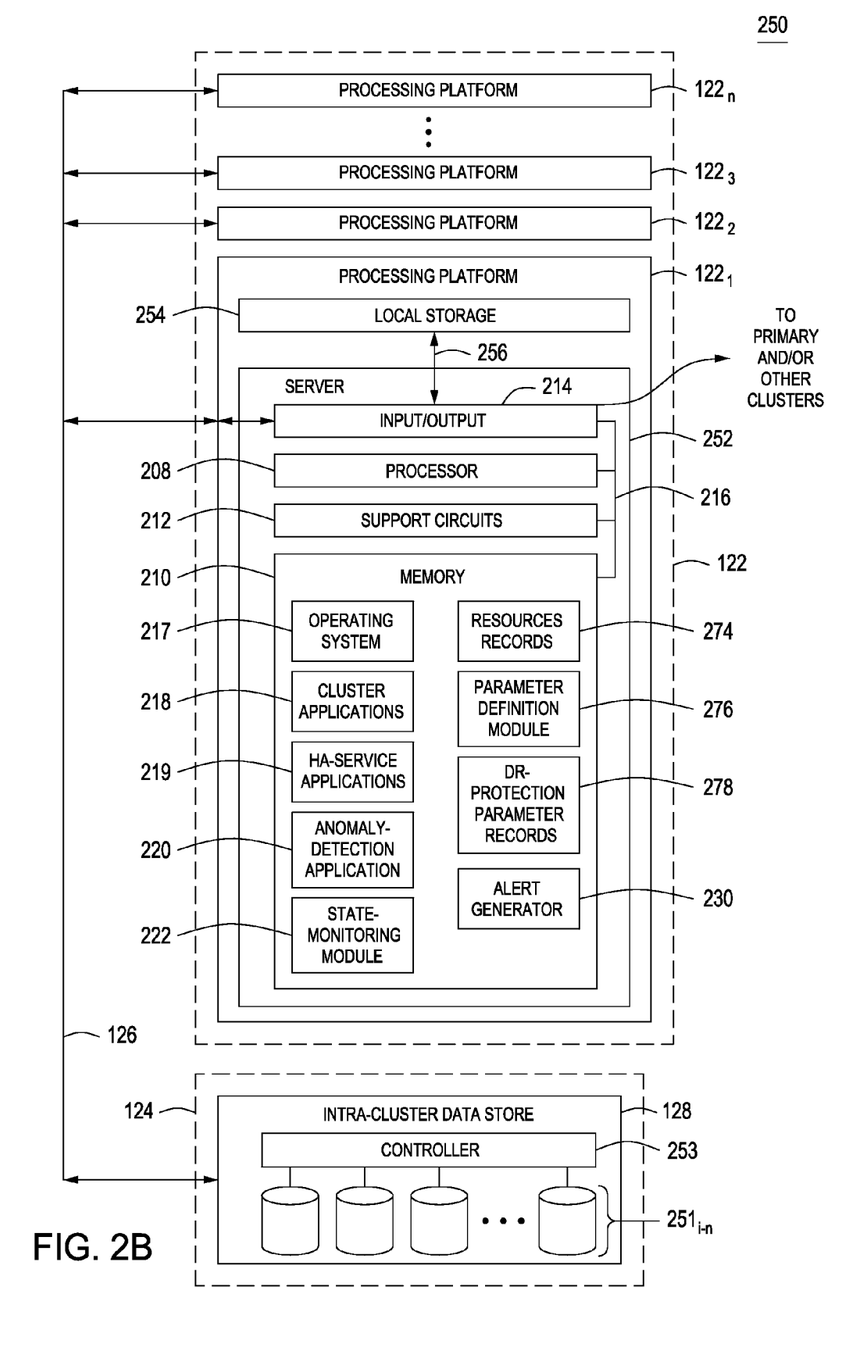

FIGS. 2A and 2B are block diagram illustrating example primary and secondary cluster resources 200, 250 of respective clusters of a high-availability computing system. The primary cluster resources 200 may embody any and/or all of the primary-cluster resources 110 discussed above. The secondary-cluster resources 250 may embody any and/or all of the secondary-cluster resources 112 discussed above. For convenience, the primary and secondary cluster resources 200, 250 are described with reference to the primary and secondary clusters 102, 104, respectively, and the HA-computing system 100 of FIG. 1.

The primary-cluster resources 200 may include the primary-cluster processing resources 114 and the primary-cluster storage resources 116, which are communicatively coupled via the intra-cluster link 118. As above, the primary-cluster processing resources 114 may include the processing platforms $114_{1-n}$ and the primary-cluster storage resources 116 may include the primary intra-cluster data store 120.

The primary-cluster data store 120 may include a number of storage devices $201_{1-n}$ and a controller 203. The storage devices $201_{1-n}$ and a controller 203 may be arranged as, be configured to and/or otherwise operate as any of a redundant array of independent disks ("RAID"), a storage area network ("SAN") array and the like.

Each of the processing platforms $114_{2-n}$ may include architecture the same as or analogous to the architecture of the processing platform $114_1$, and/or operate in the same or in a manner analogous to the processing platform $114_1$. For simplicity of exposition, only the architecture and operation of the processing platform $114_1$ is described below.

The processing platform $114_1$ include a server 202 and attendant data storage 204 that communicatively couple via respective a communication link ("local-communication link") 206. The local-communication link 206 may be formed in accordance with one or more protocols of wired, wireless, satellite, and/or optical communications, including, for example, Ethernet and SONET protocols.

The attendant data storage 204 may be or employ any of random access memory, read-only memory, optical storage, magnetic storage, removable storage, erasable programmable read only memory and variations thereof, content addressable memory and variations thereof, flash memory, disk drive storage, removable storage and the like. The attendant data storage 204 may be positioned remotely from the server 202, and act as a "network" data store via the local-communication link 206. The attendant data storage 204 generally operates as a data store for the server 202, and is generally dedicated to handle storage requirements for only the server 202.

The attendant data storage 204 may also handle storage requirements for servers of the other processing platforms $114_{2-n}$ when the processing platforms $114_{1-n}$ form the virtual processing platform. As described in more detail below, the server 202 may use the attendant data storage 204 to facilitate performing its functions.

The server 202 may be deployed in one or more general or specialty purpose computers, personal computers, mainframes, minicomputers, server-type computers and/or any processor-based platform that operates on any suitable operating system, such as Microsoft® Windows®, UNIX, Linux and/or Symbian; and that is capable of executing software.

The server 202 may include a large number of elements; many of which are not shown in FIG. 2A for simplicity of exposition. The elements of server 202 may be formed in a single unitary device and concentrated on a single server, client, peer or other type node. Alternatively, the elements of the server 202 may be formed from two or more separate devices, and as such, may be distributed among a number of server, client, peer or other type nodes.

The server 202 may be deployed in accordance with the scale-up and/or scale-out approaches. Using the scale-up approach, the server 202 may have its processing power, amount of memory and number of networkable connections increased by utilizing a symmetrical, multi-processor architecture so as to provide additional capacity. A benefit of this scale-up approach is that such approach provides for simplified configuration and management as compared to the scale-out approach.

Using the scale-out approach, the server 202 may have its processing power, amount of memory and number of networkable connections increased by incrementally adding and/or removing capacity as needed, balancing workload across multiple processors, multiple servers, dedicating specific processors and/or servers for performing specific tasks, using physical or logical servers (e.g., a multi-node cluster approach), etc. In addition, the server 202 may be configurable to communicate with servers of the other processing platforms $114_{2-n}$ via the intra-cluster link 118 so as to form, be arranged or otherwise be combined to form a clustering or virtual processing platform environment within the HA-computing system 100.

As shown, the server 202 may include one or more processing units (collectively "processor") 208, memory 210, supports circuits 212, input/output ("I/O") interface 214 and bus 216. The processor 208 may be one or more conventional processors, microprocessors, multi-core processors, microcontrollers and the like.

The bus 216 provides for transmissions of digital information among the processor 208, memory 210, support circuits 212, I/O interface 214 and other portions of the server 202 (not shown). The support circuits 212 facilitate operation of the processor 208, and may include well-known circuitry or circuits, including, for example, one or more I/O interfaces; one or more network interface units ("NIUs"); cache; clock circuits; power supplies and the like.

The I/O interface 214 provides an interface to control the transmissions of digital information between components of processing platform $114_1$ (shown and not shown) and between the processing platform $114_1$ and the other portions of the HA-computing system 100. To facilitate this, the I/O interface 214 may include (i) a NIU for facilitating exchange (e.g., sending and/or receiving) of information, including the intra-cluster states and cluster parameters, with the attendant storage 204 via the local-communication link 206, (ii) a NIU for facilitating exchange of information, including the intra-cluster states and cluster parameters, with the other portions of the cluster resources 200 via the intra-cluster link 118 and/or (iii) a NIU for facilitating exchange of information, including the inter-cluster states, cluster parameters and server parameters, with the secondary and/or other clusters 104, 108 via the network 106. Accordingly, the NIUs may be adapted for communicating in accordance with one or more protocols of wired, wireless, satellite, and/or optical communications, including, for example, Ethernet and SONET protocols In addition, the I/O interface 214 provides an interface to control the transmissions of digital information between I/O devices (not shown) associated with or otherwise attached to the server 202. The I/O devices (not shown) may be embodied as any of (i) storage devices, including but not limited to, a tape drive, a floppy drive, a hard disk drive or a compact disk drive, (ii) a receiver, (ii) a transmitter, (iii) a speaker, (iv) a display, (v) a speech synthesizer, (vi) an output port, and (vii) a pointing device, such as a mouse, joystick, trackball, touchpad, pointing stick, light pen, head pointer, soap mouse, eye tracking devices, digitizing tablet and stylus, data glove that translates the user's movements to computer gestures; and a key-in device, such as a keyboard or a touchpad, (vii) and the like.

The memory 210 may be or employ any of random access memory, read-only memory, optical storage, magnetic storage, removable storage, erasable programmable read only memory and variations thereof, content addressable memory and variations thereof, flash memory, disk drive storage, removable storage and the like. The memory 210 may be generally positioned within and/or resident to the server 202. The memory 210 may also be extended (e.g., by way of the operating system) to include the attendant data storage 204. For simplify of exposition, the memory 210 and the attendant data storage 204 operate in conjunction, and as such, are collectively referred to herein after as memory 210, unless otherwise stated.

The memory 210 may store and may be queries by the processor 208 to obtain various software packages to be executed locally on the server 202. These software packages may include an operating system 217, one or more software applications for clustering the processing platforms $114_{1-n}$ ("cluster applications 218") and one or more software applications for carrying out the HA-computing services ("HA-service applications 219").

The cluster applications 218 may be executed by the processor 208 (and processors of the other processing platforms $114_{2-n}$) to cause clustering of and/or formation of a virtual processing platform from the processing platforms $114_{1-n}$ for executing any, some or all of the HA-service applications 219. In addition, the cluster applications 218 may include an inter-cluster-replication application and an intra-cluster-replication application.

The inter-cluster-replication application may be executed by the processor 208 to obtain one or more of the inter-cluster states, and to exchange with or cause replication of such inter-cluster states on the secondary cluster 104. The intra-cluster-replication application may be executed by the processor 208 to obtain one or more states of the intra-cluster states, and to exchange with or cause replication of such intra-cluster states on the primary intra-cluster data store 120. The cluster applications 218 may include, for example, VERITAS Clustering Software ("VCS") with its global clustering option ("GCO"), Microsoft Cluster Server ("MCS"), VERITAS Volume Replicator ("VVR"), Symmetrix Remote Data Facility ("SRDF"), Hitachi True Copy ("HTC"), a clustering application employing a high-availability disaster-recovery ("HADR") application and the like.

The software applications may also include an anomaly-detection application 220, a state-monitoring module 222 and, optionally, an alert generator 230. The memory 210 may further store operands, operators, dimensional values, configurations, parameters and other data (collectively "information") that may be used by any of the operating system 217, cluster applications 218, HA-service applications 219, anomaly detection application 220, state-monitoring module 222 and alert generator 230 to control the operation of and/or facilitate performing the functions of the server 202, and in turn, the cluster resources 200 and the HA-computing system 100.

The information may include any of the inter-cluster states and the intra-cluster states (not shown). The information may also include one or more records 220 associated with the primary-cluster resources 110 ("resources records"), one or more records associated with parameter definitions ("parameter-definition records") 226 and one or more records associated with parameters defining the protection provided by the DR protocols ("DR-protection-parameters records") 228.

The resources records 224 may include information denoting the computing resources of any of the primary cluster 102, secondary cluster 104, other clusters 108 and/or the HA-computing system 100, in whole or in part. As described in more detail below with respect to FIG. 3, the resources records 224 may include information denoting the computing resources 200 (or 110 or 112) allocated to, consumed by or otherwise associated with one of the HA-service applications 219, including any of an application resource, file system and/or volume resource, a disk group resource, a replication resource, and a virtualization resource.

The parameter-definition records 226 may include definitions for a respective number of parameters associated with resources of the computing resources of any of the primary cluster 102, secondary cluster 104, other clusters 108 and/or the HA-computing system 100, in whole or in part. These definitions may include definitions for any of the DR-protection parameters, system parameters, primary-cluster parameters, which, in turn, may include definitions for the server 202 ("server parameters").

The server parameters may include one or more parameters associated with the computing resources 200 (or 110) allocated to, consumed by or otherwise associated with one of the HA-service applications 219, including parameters associated with the (i) application resource ("application-resource parameters"), (ii) file system and/or volume resource ("file-system/volume-resource parameter"), (iii) disk group resource ("disk-group-resource parameter") and (iv) replication resource ("replication-resource parameter").

The DR-protection-parameters records 228 may include, in addition to, as an alternative to and/or in lieu of any of the system, cluster and server parameters, the DR-protection parameters. These DR-protection parameters may be used for preventing an abortive failover. The DR-protection parameters may be arranged into one or more groups of protection parameters ("protection groups") and/or one or more groups associated with the HA-service applications 219 ("service groups"). One or more of service groups may be part of or otherwise associated with one of more of the protection groups. Such association may be reflected in definitions of the parameter-definition records 226.

The DR-protection parameters may include one or more parameters for indicating a state of the data replication of any resource of the HA-computing system 100, including any of the computing, application and/or storage resources (i) among any of the first, second and/or other clusters 102, 104 and 108, and/or (ii) within any of the first, second and/or other clusters 102, 104 and 108. The DR-protection parameters may also include parameters for indicating an automatic management of the intra-cluster and/or inter-cluster states of data replication. These parameters may include, for example, parameters of automatic data replication achieved by the clustering software 218, such the VCS. The DR-protection parameters may further include parameters for indicating one or more percentages of data replication for one or more of the protection groups. The DR-protection parameters may include one or more protection-level parameters for verifying that all of the storage resources for the given HA-service applications have been (or conversely, have not been) replicated.

The DR-protection parameters may include parameters for indicating a type of replication, such as any of synchronous data replication, asynchronous data replication, consistent replication, inconsistent replication and the like. The DR-protection parameters may also include parameters that define one or more requirements of the synchronous and consistent replication for critical applications. The DR-protection parameters may also include parameters for indicating a number of clusters or sites to which replication is shared (e.g., three cluster/site replication).

Alternatively and/or additionally, the DR-protection parameters may also include parameters for indicating time limits of recovery time objective ("RTO") and/or recovery point objective ("RPO") in accordance with requirements of a business organization. To facilitate association between the time of the RTO and the time limits of the RPO, the parameter-definition records 226 may include one or more definitions defining such associations with the protection groups in accordance with requirements of the service groups.

The DR-protection parameters may also include parameters for indicating a scheduled data recovery testing of the HA-computer system 100. The data recovery testing of the HA-computer system 100 may be, for example, a virtual data recovery testing by using the clustering applications 219.

The state-monitoring module 222 may monitor one or more states of the HA-computing system 100, including inter-cluster and intra-cluster states. To facilitate this, the state-monitoring module 222 may use the clustering applications 218 and the replication applications thereof. The state-monitoring module 222 may monitor one or more states of any of the system, cluster and server parameters. Responsive to monitoring the aforementioned states, the state-monitoring module 222 may set values of the DR-protection parameters that correspond to the system, cluster and server so monitored. For example, for a replicated storage resource of the HA-computer system 100, the state-monitoring module 222 may set a value of the DR-protection parameters corresponding to such replicated storage resource.

The anomaly-detection application 220 may detect one or more anomalies associated with the server parameters, cluster parameters, system parameters and/or DR-protection parameters. The anomaly-detection application 220 may, for example, detect the inter-cluster anomalies (e.g., by performing a comparison) among system parameters associated with the primary cluster 102 and the secondary cluster 104. The anomaly-detection application 220 may also detect the inter-cluster anomalies by, for example, detecting a mismatch in the file system resource of the primary cluster 102 and the replicated file system resource of the secondary cluster 104. Alternatively and/or additionally, the anomaly-detection application 220 may detect the inter-cluster anomalies by detecting a mismatch in the state of the data replication (e.g., the percentage of data replication) among the primary and second clusters 102, 104.

Alternatively and/or additionally, the anomaly-detection application 220 may detect one or more of the intra-server anomalies associated with the server and/or cluster parameters. The anomaly-detection application 220 may, for example, detect the intra-cluster anomalies by detecting a mismatch between the disk group resource and the replication resource. Alternatively and/or additionally, the anomaly-detection application 220 may detect the intra-cluster anomalies by detecting a mismatch over a period when a last data recovery test was performed.

The anomaly-detection application 220 may detect one or more of any of the inter-cluster and intra-cluster anomalies by detecting the mismatch in the automatic management of the state of data replication. To facilitate this, the anomaly-detection application 220 may compare to determine one or more matches (or conversely mismatches) among monitored states of the server parameters, cluster parameters, system parameters and/or DR-protection parameter and corresponding defined states of the server parameters, cluster parameters, system parameters and/or DR-protection parameter.

The alert-generator module 230 operates to generate an alert response to the anomaly-detection application 220 detecting any of the inter-cluster and intra-cluster anomalies.

With reference now to FIG. 2B, the secondary-cluster resources 250 may include architecture the same as or analogous to the architecture of the primary-cluster resources 200, and/or operate in the same or in a manner analogous to the primary-cluster resources 200 except as described herein. The second-cluster resources 252 may include the secondary-cluster processing resources 122 and the secondary-cluster storage resources 124, which are communicatively coupled via the intra-cluster link 126. As above, the secondary-cluster processing resources 122 may include the processing platforms $122_{1-n}$ and the primary-cluster storage resources 124 may include the secondary intra-cluster data store 128.

The secondary-cluster data store 128 may include a number of storage devices $251_{1-n}$ and a controller 253. The storage devices $251_{1-n}$ and a controller 253 may be arranged as, be configured to and/or otherwise operate as any of a RAID, a SAN array and the like.

Each of the processing platforms $122_{2-n}$ may include architecture the same as or analogous to the architecture of the processing platform $122_1$, and/or operate in the same or in a manner analogous to the processing platform $122_1$. For simplicity of exposition, only the architecture and operation of the processing platform $122_1$ is described below.

The processing platform $122_1$ include a server 252 and attendant data storage 254 that communicatively couple via respective a local-communication link 256. The local-communication link 256 may be formed in accordance with one or more protocols of wired, wireless, satellite, and/or optical communications, including, for example, Ethernet and SONET protocols.

The attendant data storage 254 may be or employ any of random access memory, read-only memory, optical storage, magnetic storage, removable storage, erasable programmable read only memory and variations thereof, content addressable memory and variations thereof, flash memory, disk drive storage, removable storage and the like. The attendant data storage 254 may be positioned remotely from the server 252, and act as a "network" data store via the local-communication link 206. The attendant data storage 254 generally operates as a data store for the server 252, and is generally dedicated to handle storage requirements for only the server 252.

The attendant data storage 252 may also handle storage requirements for servers of the other processing platforms $122_{2-n}$ when the processing platforms $122_{1-n}$ form the virtual processing platform. The server 252 may use the attendant data storage 254 to facilitate performing its functions.

The server 252 has an architecture substantially the same of the architecture of the server 202 of FIG. 2A. As show, the memory 210 of the server 252 includes one or more resource records 274 associated with the second-cluster resources 112, parameter-definition records 276 and DR-protection-parameters records 278.

The resources records 274 may include information denoting the computing resources of any of the primary cluster 102, secondary cluster 104, other clusters 108 and/or the HA-computing system 100, in whole or in part. As described in more detail below with respect to FIG. 3, the resources records 274 may include information denoting the secondary-computing resources 252 (or 112) allocated to, consumed by or otherwise associated with one of the HA-service applications 219, including any of an application resource, file system and/or volume resource, a disk group resource, a replication resource, and a virtualization resource.

The parameter-definition records 276 may include definitions for a respective number of parameters associated with resources of the computing resources of any of the primary cluster 102, secondary cluster 104, other clusters 108 and/or the HA-computing system 100, in whole or in part. These definitions may include definitions for any of the DR-protection parameters, system parameters, the primary-cluster parameters, which, in turn, may include definitions for the server parameters of server 252.

The server parameters may include one or more parameters associated with the secondary-computing resources 252 (or 212) allocated to, consumed by or otherwise associated with one of the HA-service applications 219, including any of the application-resource, file-system/volume-resource, disk-group-resource and replication resource parameters.

The DR-protection-parameters records 278 may include, in addition to, as an alternative to and/or in lieu of any of the system, cluster and server parameters, the DR-protection parameters. These DR-protection parameters may be used for preventing an abortive failover. The DR-protection parameters may be arranged into one or more groups of protection parameters ("protection groups") and/or one or more groups associated with the HA-service applications 219 ("service groups"). One or more of service groups may be part of or otherwise associated with one of more of the protection groups. Such association may be reflected in definitions of the parameter-definition records 276.

The DR-protection parameters may include one or more parameters for indicating a state of the data replication of any resource of the HA-computing system 100, including any of the computing, application and/or storage resources (i) among any of the first, second and/or other clusters 102, 104 and 108, and/or (ii) within any of the first, second and/or other clusters 102, 104 and 108. The DR-protection parameters may also include parameters for indicating an automatic management of the intra-cluster and/or inter-cluster states of data replication. These parameters may include, for example, parameters of automatic data replication achieved by the clustering software 218, such the VCS. The DR-protection parameters may further include parameters for indicating one or more percentages of data replication for one or more of the protection groups.

The DR-protection parameters may include parameters for indicating a type of replication, such as any of synchronous data replication, asynchronous data replication, consistent replication, inconsistent replication and the like. The DR-protection parameters may also include parameters that define one or more requirements of the synchronous and consistent replication for critical applications. The DR-protection parameters may also include parameters for indicating a number of clusters or sites to which replication is shared (e.g., three cluster/site replication).

Alternatively and/or additionally, the DR-protection parameters may also include parameters for indicating time limits of RTO and/or RPO in accordance with requirements of a business organization. To facilitate association between the time of the RTO and the time limits of the RPO, the parameter-definition records 276 may include one or more definitions defining such associations with the protection groups in accordance with requirements of the service groups.

The DR-protection parameters may also include parameters for indicating a scheduled data recovery testing of the HA-computer system 100. The data recovery testing of the HA-computer system 100 may be, for example, a virtual data recovery testing by using the clustering applications 219.

Example Primary and Secondary Clusters

Figure 3:
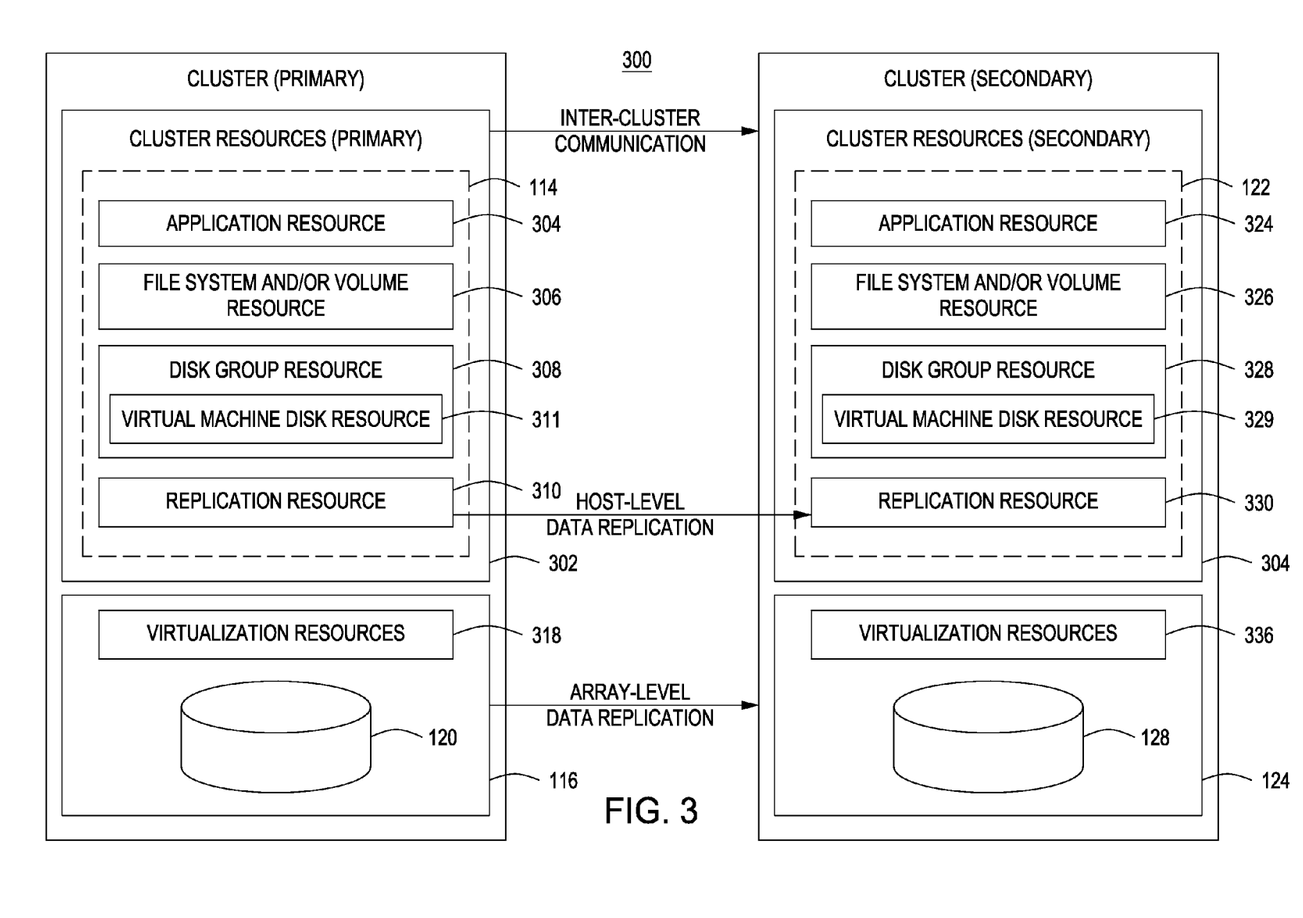
FIG. 3 is a block diagram illustrating example primary-cluster and secondary-cluster resources of respective clusters of a high-availability computing system.

FIG. 3 is a block diagram illustrating example primary-cluster resources and secondary-cluster resources 302, 304 of primary and secondary clusters, respectively, of a high-availability computing system. The primary-cluster and secondary-cluster resources 302, 304 may embody the primary-cluster and/or secondary-cluster resources 200, 250 discussed above. For convenience, the primary-cluster resources and secondary-cluster resources 302, 304 are described with reference to the HA-computing system 100 of FIG. 1 and the primary and secondary cluster resources 200, 250 of FIGS. 2A and 2B.

The primary-cluster resources 302 may include, within the primary-cluster processing resources 114, an application resource 304, a file system and/or volume resource 306, a disk group resource 308, and a replication resource 310. The application resource 304 may be one the HA-services applications 219 ("given HA-service application"), which may be or embody any of financing software, designing software (e.g. Auto CAD), weather forecasting software, production monitoring software. The given HA-service application may also be and/or embody any of a DBMS-based application and/or a database application, such as ORACLE, SAP or DB2.

The application resource 304 may be mounted on the file system and/or volume resource 306, which may be formed in accordance with one or more file system/volume protocols, including for example, File Allocation Table ("FAT"), New Technology File System ("NTFS"), Virtual File System ("VFS"), Journaled File System ("JFS"), Virtual Machine File System ("VMFS") and the like. The application resource 304 may use mounting points (e.g., /mnt, /opt and/or the like) of the volume resource of the file system and/or volume resource 306.

The primary-cluster resources 302 may use the disk group resource 308 for its storage configuration of the memory 210. The disk group resource 308 generally includes volume manager software, such as Logical Volume Manager ("LVM"), VERITAS Volume Manager ("VVM") and the like, which may, for example, provide storage level virtualization. The disk group resource 308 may configure multiple numbers of physical storage disks of the memory 210 into one or more disk groups, and each of the disk groups may have a common configuration. The disk group resource 308 may also include a virtual machine disk resource 311. This virtual machine disk resource 311 may configured for handling a virtual machine environment, such as VMware ESX.

The replication resource 310 may be and/or employ a software module that manages replication of the intra-cluster states within the primary-cluster resources 302. The replication resource 310 may, for example, select one or more of the disk groups of the disk group resource 308 for replication of these disk groups in the primary intra-cluster data store 120. The replication resource 310 may, for example, use the one of the clustering applications 218, such as VERITAS Volume Replicator ("VVR"), for managing replication of the intra-cluster states.

The primary-cluster resources 302 may include, within its primary-cluster storage resource 116, a virtualization resource 318 along with the primary intra-cluster data store 120. The primary intra-cluster data store 120 may include one of more logical unit number (LUN) configured in the device and/or one or more LUN group at an array level. The storage virtualization resources 318 may be, for example, an EMC INVISTA or an IBM SAN volume controller to provide an efficient storage management within the primary cluster 102.

The secondary-cluster resources 304 may include architecture the same as or analogous to the architecture of the primary-cluster resources 302, and/or operate in the same or in a manner analogous to the primary-cluster resources 302. For simplicity of exposition, the architecture and operation of the other clusters is assumed herein to be the same as the primary and/or second clusters 102, 104, unless otherwise stated The secondary-cluster resources 304 may include, within its secondary-cluster processing resources 122, replicated versions of the application resource 304, the file system and/or volume resource 306, disk group resource 308, virtual machine disk resource 311 and replication resource 310, namely, replicated-application resource 324, replicated file system and/or volume resource 326, replicated disk group resource 328, replicated virtual machine disk resource 329 and replicated replication resource 330, These replicated version may perform functions similar to their counterpart elements in the primary-cluster resources 302. The secondary-cluster resources 304 may also include, within its secondary-cluster storage resources 124, replicated versions of the primary intra-cluster data store 116 and virtualization resource 318, namely, the secondary intra-cluster data store 128 and virtualization resource 336.

In a high availability computing system 300, in order to recover the application on the same and/or across site, the storage resources of the given HA-services application, such as the file system or volume resource, disk groups resource and/or the like needs to be replicated. Mismatches in the configuration of resources within and/or across the primary cluster and/or secondary-cluster resources 302, 304 may produce the inter-cluster and/or intra-cluster anomalies, respectively, and thereby prevent the failover of the given HA-services application on occurrence of the failure.

For example, a mismatch of the disk group resource parameter, such as logical unit number ("LUN") between the processing platforms 114 and the primary intra-cluster data store 120 may produce one of the intra-cluster anomalies. Alternatively, a mismatch between the disks and/or the virtual machine disks in the disk group resource 308 of the primary-cluster resources 302 and the corresponding LUNs in the primary intra-cluster data store 120 may produce one of the intra-cluster anomalies.

As another alternative, a mismatch between configuration of the one or more LUNs for the given HA-services application in the primary intra-cluster data store 120 and the secondary intra-cluster data store 128 may produce one of the inter-cluster anomalies. A mismatch of array level storage objects across the primary cluster and/or secondary-cluster resources 302, 304 may produce one of the inter-cluster anomalies.

A mismatch of disk group resource, such as LUN between the one or more processing platforms 114, 122 of the primary-cluster resources 302 and the secondary computer cluster site 304 may produce one of the inter-cluster anomalies. A mismatch of between or a different number of file systems and/or file system mounts points across the primary-cluster resources 302 and the secondary-cluster resources 304 may produce the intra-cluster anomaly.

Example Operation

Figure 4:
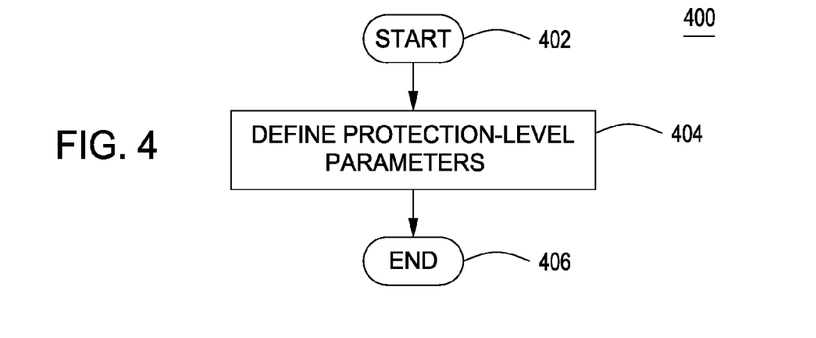
FIG. 4 is a flow diagram illustrating a process for defining disaster-recovery protection parameters in a high-availability computing system.

FIG. 4 is a flow diagram illustrating a process 400 for defining DR-protection parameters in a high-availability computing system. For convenience, the process 400 is described with reference to the primary-cluster resources and secondary-cluster resources 302, 304 of FIG. 3, the HA-computing system 100 of FIG. 1 and the cluster resources 200,250 of FIGS. 2A and 2B.

The process 400 starts at termination block 402 after an occurrence of an event, such as the processing platform $114_1$ executing (e.g., launch, generate, run, maintain, etc.) the anomaly-detection application 220. The event may be other trigger or stimulus as well. After termination block 402, the process 400 may transition to process block 404.

At process block 404, the DR-protection parameters of a protection group are defined. The DR-protection parameters may be defined in accordance with the SLA of a business. For example, the DR-protection parameters may define time limits of the RTO for the protection groups in accordance with SLA or in accordance with a priority associated with the protection groups. The protection level parameters may be defined by a user, such as an administrator of the HA-computing system 100.

The DR-protection parameters may, alternatively and/or additionally, be configured in accordance with compliance, such as data recovery compliance, business continuity compliance and the like. For example, the DR-protection parameters may indicate the time limits of the RPO as per the requirements of a critical application. After process block 404, the method 400 proceeds to termination block 406.

At process block 406, the process 400 may end. Alternatively, the process 400 may be repeated periodically, in continuous fashion, or upon being triggered as a result of a condition or event.

Figure 5:
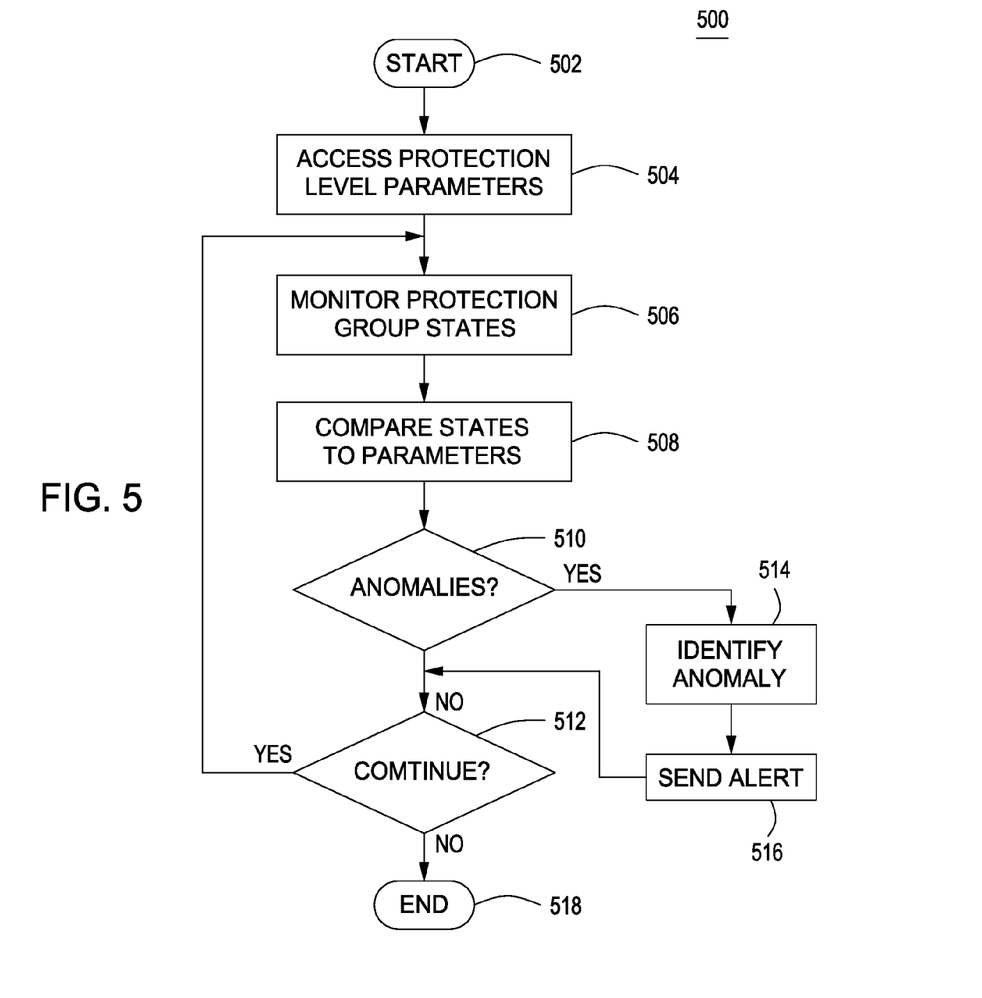
FIG. 5 is a flow diagram illustrating a process for detecting an anomaly in a high-availability computing system.

FIG. 5 is a flow diagram illustrating a process 500 for detecting an anomaly in a high-availability computing system. For convenience, the process 500 is described with reference to the process 400 of FIG. 4, the primary-cluster resources and secondary-cluster resources 302, 304 of FIG. 3, the HA-computing system 100 of FIG. 1 and the cluster resources 200,250 of FIGS. 2A and 2B.

The process 500 contemplates detecting one or more of the intra-cluster and inter-cluster anomalies as carried out (in large part) using the various software packages of the processing platform $114_1$ of the primary-cluster resources 302, including for example, the anomaly-detection application 220 and the state-monitoring module 222. The process 500 may alternatively be carried out using the various software packages of any of (i) the processing platforms $114_{1-n}$ (individually, combined or in virtual form), (ii) the processing platforms $118_{1-n}$ of the secondary-cluster resources 304 (individually, combined or in virtual form), and/or (iii) processing platforms of the other clusters 108.

The process 500 starts at termination block 502 after an occurrence of an event, such as the processing platform $114_1$ executing (e.g., launch, generate, run, maintain, etc.) the anomaly-detection application 220. The event may be other trigger or stimulus as well. After termination block 502, the process 500 may transition to process block 504.

At process block 504, the anomaly-detection application 220 accesses the DR-protection parameters in the DR-protection parameter records 228. The anomaly-detection application 220 may, for example, access user defined DR-protection parameters are in accordance with the SLA. These DR-protection parameters may be indicative of a percent-complete (e.g., a ninety percent) replication status of data of the HA-service applications 219 at the secondary cluster 104 as a requirement in an asynchronous type of data replication. The DR-protection parameters associated with the protection groups may indicate to replicate the storage resources of the service groups. After process block 504, the process 500 may transition to process block 506.

At process block 506, the state-monitoring module 222 monitors one or more of the states of the DR-protection parameters of one or more of the protection groups. The state-monitoring module 222 may, for example, the DR-protection parameters indicating a period of last performed data recovery testing using a fire drill feature of the clustering applications 218. Alternatively and/or additionally, the state-monitoring module 222 may monitor the DR-protection parameters indicative of the RPO using a replication technology query. After process block 506, the process 500 may transition to process block 508.

At process block 508, the anomaly-detection application 220 may compare the monitored DR-protection states of the protection groups with the DR-protection parameters ("defined DR-protection parameters") of the DR-protection parameter records 228. After process block 508, the process 500 may transition to decision block 510.

At decision block 510, the anomaly-detection application 220 detects whether an anomaly exists between the monitored DR-protection states and the defined DR-protection parameters. This may include the anomaly-detection application 220 detecting whether one or more of the monitored DR-protection states differ from the defined DR-protection parameters, including the monitored DR-protection states and defined DR-protection parameters within and/or among any of the first, second and other clusters 102, 104 and 108 and/or the HA-computing system (in whole or in part).

For example, the anomaly-detection application 220 may determine a mismatch between the RPO of the monitored DR-protection parameters and the RPO of the defined DR-protection parameters. Alternatively and/or additionally, the anomaly-detection application 220 may determine a mismatch between the RTO of the monitored DR-protection states and the RTO of the defined DR-protection parameters.

As another example, the anomaly-detection application 220 may determine a mismatch in percentage of data replicated of, for example, an asynchronous replication set forth in the monitored DR-protection parameters and those set forth in the defined DR-protection parameters. The monitored DR protection level parameters may indicate, for example, sixty percent (60%) of the data is replicated, while defined DR protection level parameters indicated that 80% of the data is replicated.

If the anomaly-detection application 220 does not detect that the anomaly exists, then the process 500 may transition to decision block 512. If the anomaly-detection application 220 detects that the anomaly exists, then the process 500 may transition to process block 514.

At process block 514 the anomaly is identified. The process 500 may then transition to process block 516. At process block 516, an alert is generated and sent (e.g., by the alter generator 230 of FIG. 2). The alert may, in turn, cause a report to be generated and reported to one or more users of the HA-computing system 100, including, for example, the system administrator. The report may include notations indicating which of the intra-cluster and inter-cluster anomalies cause the alert to be set. Alternatively and/or additionally, the alert and/or report may be used to guide one or more of the users to take appropriate actions to alter the HA-computing system 100 to resolve the intra-cluster and inter-cluster anomalies causing the alter to be set. After process block 518, the method 500 may transition to decision block 512.

At decision block 512, a determination is made regarding continuous monitoring of the DR-protection parameters of the protection groups. If the continuous monitoring of the protection parameters is determined affirmatively, the process 400 proceeds to process block 506. If there is no need of continuous monitoring of the DR-protection parameters, the method 400 proceeds to termination block 518.

At termination block 518, the process 500 may end. Alternatively, the process 500 may be repeated periodically, in continuous fashion, or upon being triggered as a result of a condition or event.

CONCLUSION

Those skilled in the art will appreciate that the present invention, according to its various embodiments, Variations of the method, apparatus and system described above are possible without departing from the scope of the invention. In view of the wide variety of embodiments that can be applied, it should be understood that the illustrated embodiments are exemplary only, and should not be taken as limiting the scope of the following claims.

For example, although not specifically stated above, the network 106 may be integral to or integrated with other private and public satellite, terrestrial wireless, and wireline networks to provide a wide-ranging coverage area. Furthermore, it is recognized that differences between private and public networks, and differences between circuit-switched and packet-data networks may only be a matter of semantics due to convergence between telecommunication and computing technologies.

In addition, the network 106 may include a few or, alternatively, many network elements, none of which are shown. Using sophisticated and/or simple routing schemas, the network 106 may provide connectivity between the elements of the HA-computing system 100 using few or many of its network elements. The network 106 may be configured in accordance with any number of communication and/or security protocols.

In accordance with above, these communication protocols may include any of 1G, 2G, 2.5G, 3G and 4G telecommunication protocol, which may include any the commonly used protocols, such as Advanced Mobile Phone Service ("AMPS"), Time Division Multiple Access ("TDMA"), Global System for Mobile Communications ("GSM"), and Code Division Multiple Access ("CDMA"), Universal Mobile Telecommunications Service ("UMTS"), Wide-band CDMA ("WCDMA"), ultra wideband CMDA, CDMA2000, Generic Packet Radio Services ("GPRS"), Telecommunications Industry Association's ("TIA") IS-94 specifications, and any combination or variation thereof.

The communication protocols may also include any WLAN, WMAN, and/or PAN protocols, which may include any of the commonly used protocols, such as the Institute of Electrical and Electronic Engineers ("IEEE") 802.11 et seq.; IEEE 802.16 protocol; the IEEE 802.15 protocol, the ZigBee specification, the Bluetooth Specification, the WOTS specification, the HiperLAN specification, the HomeRF specification and/or any other wireless-networking protocol that promulgates rules to use licensed and/or freely-available, unlicensed spectrum, which in the United States includes the Industrial, Scientific, and Medical ("ISM") bands.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the described methods.

It will be apparent to one of ordinary skill in the art that aspects of the invention, as described above, may be implemented in many different forms of logic, including software, firmware and hardware, in the examples illustrated in the Figures. Actual software code (e.g., computer or logic executed instructions) or specialized hardware used to implement aspects consistent with the present invention is not limiting of the present invention. Thus, the operation and behavior of the aspects may not have been described with reference to any specific logic, including specific software code and/or specific hardware logic. It should be understood that a person of ordinary skill in the art would be able to design software and control hardware to implement the aspects of the present invention based on the description herein.

The foregoing description provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

Exemplary embodiments have been illustrated and described. Further, the claims should not be read as limited to the described order or elements unless stated to that effect. In addition, use of the term "means" in any claim is intended to invoke 35 U.S.C. §112, ¶ 6, and any claim without the word "means" is not so intended.

We claim:

1. A method comprising:
obtaining a first parameter of a first cluster, wherein
the first cluster is operable to provide computing services to one or more client systems,
data is replicated from the first cluster to a second cluster in accordance with a disaster recovery ("DR") protocol,
the second cluster is operable to provide the computing services to the client system(s) responsive to a failover from the first cluster, and
the first parameter of the first cluster is accessed in accordance with the DR protocol when replicating the data from the first cluster to the second cluster;
monitoring a state of a second parameter of the second cluster in response to the replication of the data from the first cluster to the second cluster, wherein
the second parameter of the second cluster is accessed in accordance with the DR protocol when replicating the data from the first cluster to the second cluster;
detecting, as a function of the first parameter and the state of the second parameter, at least one anomaly, wherein the at least one anomaly indicates a mismatch between the first parameter and the state of the second parameter; and
generating an alert in response to detecting the at least one anomaly.

2. The method of claim 1, wherein
the first parameter defines a set of resource configuration requirements for performing the failover from the first cluster to the second cluster.

3. The method of claim 1, further comprising:
defining the first parameter, wherein
the detecting the at least one anomaly comprises:
comparing the first parameter to the state of the second parameter; and
detecting a difference between the first parameter and the state of the second parameter.

4. The method of claim 3, wherein
the difference comprises the mismatch between the first parameter and the state of the second parameter.

5. The method of claim 1, wherein
the first parameter comprises a parameter that is associated with the first cluster of any of:
a state of data replication,
a recovery time objective RTO,
a recovery point objective, or
a data recovery test.

6. The method of claim 1, wherein
the first parameter is a configurable parameter used during replication of the data from the first cluster to the second cluster in accordance with the DR protocol, and
the state of the second parameter comprises a monitored state of a parameter that is associated with the second cluster of any of:
a state of data replication,
a recovery time objective RTO,
a recovery point objective, or
a data recovery test.

7. The method of claim 1, wherein the detecting the at least one anomaly comprises:
detecting the mismatch between a configurable recovery point objective of the first parameter and a monitored state of recovery point objective of the second parameter.

8. The method of claim 1, wherein the detecting the at least one anomaly comprises:
detecting the mismatch between the configurable recovery time objective of the first parameter and a monitored state of recovery time objective of the second parameter.

9. The method of claim 1, wherein detecting at least one anomaly comprises:
detecting the mismatch between a time period of scheduled data recovery test of the first parameter and the time period of last data recovery test of the second parameter.

10. The method of claim 1, further comprising:
defining a protection group, wherein at least one of the first or the second parameter is associated with the protection group.

11. An apparatus comprising:
a parameter definition module comprising a first parameter of a first cluster, wherein
the first cluster is operable to provide computing services to one or more client systems, data is replicated from the first cluster to a second cluster in accordance with a disaster recovery ("DR") protocol, the second cluster is operable to provide the computing services to the client system(s) responsive to a failover from the first cluster, and the first parameter of the first cluster is accessed in accordance with the DR protocol when replicating the data from the first cluster to the second cluster;

a state-monitoring module adapted to monitor a state of a second parameter of the second cluster in response to the replication of the data from the first cluster to the second cluster, wherein the second parameter of the second cluster is accessed in accordance with the DR protocol when replicating the data from the first cluster to the second cluster; and an anomaly-detection module adapted to detect, as a function of the first parameter and the state of the second parameter, at least one anomaly, wherein the at least one anomaly indicates a mismatch between the first parameter and the state of the second parameter.

12. The apparatus of claim 11, further comprising:
an alert generator adapted to generate an alert in response to the detection of the at least one anomaly.

13. The apparatus of claim 11, wherein
the anomaly-detection module is adapted to compare the first parameter to the state of the second parameter, and to detect the mismatch between the first parameter and the state of the second parameter.

14. The apparatus of claim 11, wherein
the parameter definition module is adapted to define a plurality of parameters including the first parameter, and
the plurality of parameters define a set of resource configuration requirements for performing the failover from the first cluster to the second cluster.

15. The apparatus of claim 11, wherein
the first parameter comprises a parameter that is associated with the first cluster of any of:
a state of data replication,
a recovery time objective RTO,
a recovery point objective, or
a data recovery test, and
the state of the second parameter comprises a monitored state of a parameter that is associated with the second cluster of any of:
a state of data replication,
a recovery time objective RTO,
a recovery point objective, or
a data recovery test.

16. The apparatus of claim 11, wherein
the anomaly-detection module is adapted to
compare the first parameter to the state of the second parameter, and
detect the mismatch between the first parameter and the state of the second parameter, and wherein the mismatch comprises any of:
a mismatch between a configurable state of data replication of the first parameter and a monitored state of data replication of the second parameter, a mismatch between a configurable recovery point objective of the first parameter and a monitored state of recovery point objective of the second parameter, a mismatch between the configurable recovery time objective of the first parameter and a monitored state of recovery time objective of the second parameter, or a mismatch between a time period of scheduled data recovery test of the first parameter and the time period of last data recovery test of the second parameter.

17. A system for improving failover for an application within a high-availability computing system, the system comprising:

a parameter definition module comprising a first parameter of a first cluster, wherein
the first cluster is operable to provide computing services to one or more client systems,
data is replicated from the first cluster to a second cluster in accordance with a disaster recovery ("DR") protocol,
the second cluster is operable to provide the computing services to the client system(s) responsive to a failover from the first cluster, and
the first parameter of the first cluster is accessed in accordance with the DR protocol when replicating the data from the first cluster to the second cluster;

a state-monitoring module adapted to monitoring a state of a second parameter of the second cluster in response to the replication of the data from the first cluster to the second cluster, wherein
the second parameter of the second cluster is accessed in accordance with the DR protocol when replicating the data from the first cluster to the second cluster; and an anomaly-detection module adapted to detect, as a function of the first parameter and the state of the second parameter, at least one anomaly, wherein
the at least one anomaly indicates a mismatch between the first parameter and the state of the second parameter.

18. The system of claim 17, further comprising:
an alert generator adapted to generate an alert responsive to the detection of the at least one anomaly.

19. The system of claim 17, wherein
the parameter definition module is adapted to define a plurality of parameters including the first parameter, and
the plurality of parameters define a set of resource configuration requirements for performing the failover from the first cluster to the second cluster.

20. The system of claim 17, wherein
the first parameter comprises a parameter that is associated with the first cluster of any of:
a state of data replication,
a recovery time objective RTO,
a recovery point objective, or
a data recovery test, and
the state of the second parameter comprises a monitored state of a parameter that is associated with the second cluster of any of:
a state of data replication,
a recovery time objective RTO,
a recovery point objective, or
a data recovery test.

* * * * *